US009920789B2

(12) United States Patent
Chaper et al.

(10) Patent No.: US 9,920,789 B2
(45) Date of Patent: Mar. 20, 2018

(54) UNIVERSAL JOINT WITH SIMPLIFIED STRUCTURE

(71) Applicant: AIRBUS OPERATIONS (S.A.S.), Toulouse (FR)

(72) Inventors: Camille Chaper, Toulouse (FR); David Blain, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 15/466,478

(22) Filed: Mar. 22, 2017

(65) Prior Publication Data

US 2017/0276188 A1    Sep. 28, 2017

(30) Foreign Application Priority Data

Mar. 22, 2016 (FR) .................................... 16 52433

(51) Int. Cl.
*F16C 11/12* (2006.01)
*F16D 3/56* (2006.01)

(52) U.S. Cl.
CPC ............... *F16C 11/12* (2013.01); *F16D 3/56* (2013.01); *Y10T 403/32008* (2015.01); *Y10T 403/453* (2015.01)

(58) Field of Classification Search
CPC ........ F16B 7/00; F16B 7/0406; F16B 7/0413; F16C 11/12; F16D 3/56; F16D 3/58; G01C 19/22; Y10T 403/32008; Y10T 403/32606; Y10T 403/45; Y10T 403/453; Y10T 403/54
USPC ............ 464/51, 78, 81, 84, 86; 403/53, 119, 403/220, 223, 291; 267/133, 160
See application file for complete search history.

(56) References Cited

U.S. PATENT DOCUMENTS

| 1,602,912 A | * | 10/1926 | Leipert | ..................... F16D 3/62 464/56 |
| 1,952,970 A | * | 3/1934 | Brofelth | ..................... F16D 3/56 464/81 |
| 3,081,991 A | * | 3/1963 | Swainson | ............ B60G 11/187 177/DIG. 9 |
| 3,277,555 A | | 10/1966 | Kutash | |
| 3,360,255 A | | 12/1967 | Ormond | |
| 3,427,828 A | | 2/1969 | Stiles | |

(Continued)

FOREIGN PATENT DOCUMENTS

DE           3241373 A1    5/1984

OTHER PUBLICATIONS

French Search Report for Application No. 1652432 dated Dec. 14, 2016.

(Continued)

*Primary Examiner* — Josh Skroupa
(74) *Attorney, Agent, or Firm* — Jenkins, Wilson, Taylor & Hunt, P.A.

(57) ABSTRACT

A universal joint includes a first band and a second band which are separated by a slot, are cylindrical and coaxial with one another with respect to a common axis, a first stiffener whose ends are joined to the first band, and a second stiffener whose ends are joined to the second band. A stem extends between the first stiffener and the second stiffener. A crown is around the stem. Four torsion bars exist, of which two extend between the crown and the first band and two extend between the crown and the second band.

20 Claims, 2 Drawing Sheets

(56) References Cited

U.S. PATENT DOCUMENTS

| | | | |
|---|---|---|---|
| 3,499,299 A * | 3/1970 | Hector | F16D 3/005 |
| | | | 464/150 |
| 3,722,296 A | 3/1973 | Hurlburt et al. | |
| 3,807,029 A | 4/1974 | Troeger | |
| 3,813,089 A | 5/1974 | Troeger | |
| 4,405,184 A | 9/1983 | Bahiman | |
| 4,438,655 A | 3/1984 | Quermann | |
| 4,802,784 A | 2/1989 | Brooks | |
| 4,812,072 A | 3/1989 | Brooks | |
| 5,061,107 A | 10/1991 | Brooks | |
| 5,529,277 A | 6/1996 | Ostaszewski | |
| 2017/0276187 A1 | 9/2017 | Chaper et al. | |

OTHER PUBLICATIONS

French Search Report for Application No. 1652433 dated Dec. 14, 2016.

Preinterview First Office Action for U.S. Appl. No. 15/466,252 dated Sep. 1, 2017.

\* cited by examiner

UNIVERSAL JOINT WITH SIMPLIFIED STRUCTURE

CROSS-REFERENCE TO RELATED APPLICATION

This patent application claims the benefit of and priority to French patent application number FR 16 52433, filed on Mar. 22, 2016, the entire disclosure of which is incorporated by reference herein.

TECHNICAL FIELD

The present disclosure relates to a universal joint having a simplified structure, i.e. having a reduced number of constituent parts and without frictional relative movement.

BACKGROUND

A universal joint is a mechanical component which makes it possible to connect two elements such as shafts or tubes which may move relative to one another.

A universal joint has a first axis which is aligned between the two elements. The universal joint permits two rotations, the axes of which are perpendicular to one another and perpendicular to the first axis.

A universal joint includes a number of parts that are movable relative to one another, which makes the joint bulky and generally heavy and also costly to produce.

SUMMARY

The present disclosure has an object of disclosing a universal joint of simplified structure which does not have the disadvantages of the prior art and which in particular has a simple structure.

To that end, there is provided a universal joint comprising:
a first band;
a second band, the two bands being cylindrical bands coaxial with one another with respect to a common axis, the first band and the second band being separated by a slot;
a first and a second stiffener which extend inside the bands, the first stiffener extending in a first radial plane containing the common axis, the second stiffener extending in a second radial plane orthogonal to the first radial plane and containing the common axis, each stiffener having a first end and a second end, the first and second ends of the first stiffener being joined to the first band, and the first and second ends of the second stiffener being joined to the second band;
a stem which is coaxial with the common axis and of which a first end is joined to the first stiffener and of which a second end is joined to the second stiffener;
a crown that is coaxial with the common axis and surrounds the stem;
four torsion bars which extend inside the bands in a single plane P perpendicular to the common axis and are distributed at regular angular intervals of 90° around the common axis, a first torsion bar extending in the first radial plane and having a first end joined to the first band and a second end joined to the crown, a second torsion bar extending in the second radial plane and having a first end joined to the second band and a second end joined to the crown, a third torsion bar extending in the first radial plane and having a first end joined to the first band and a second end joined to the crown, and a fourth torsion bar extending in the second radial plane and having a first end joined to the second band and a second end joined to the crown.

A universal joint of this type thus makes it possible to provide articulation by elastic deformation with a simplified structure.

BRIEF DESCRIPTION OF THE DRAWINGS

The abovementioned features of the disclosure herein, as well as others, will become more clearly apparent upon reading the following description of an exemplary embodiment, the description being given with reference to the appended FIGS. 1 and 2 of drawings, where.

DETAILED DESCRIPTION

Figure 1:
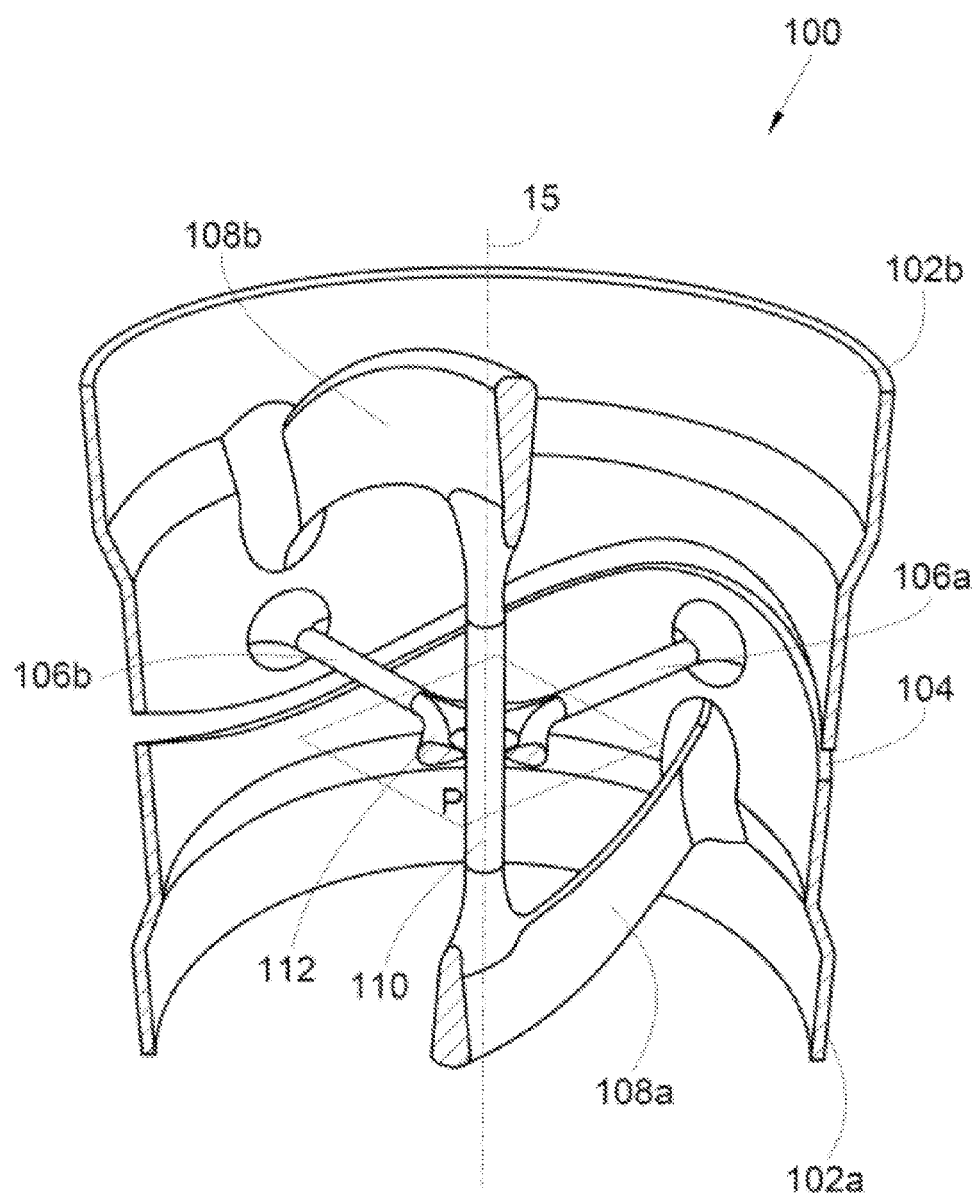
FIG. 1 is a perspective section view of a universal joint according to the disclosure herein, and where
Figure 2:
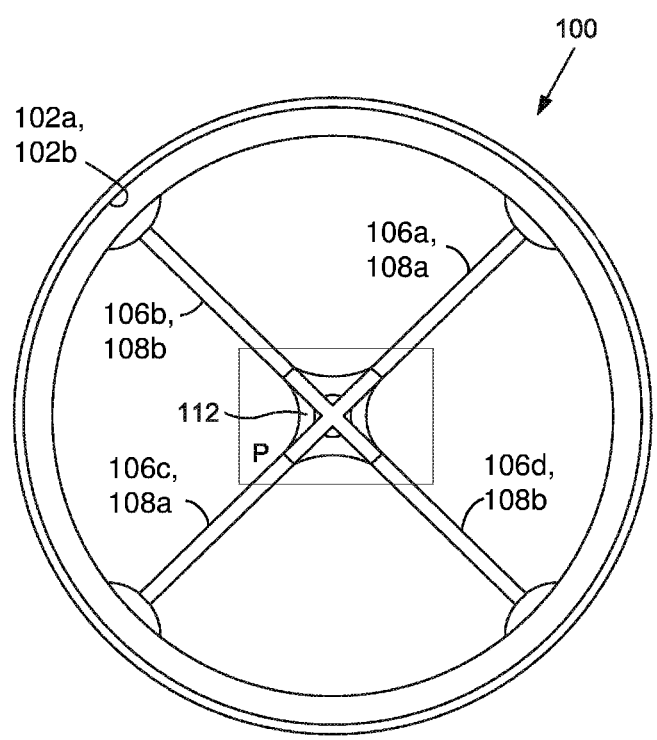
FIG. 2 is a top view of the universal joint of FIG. 1, according to the disclosure herein.

FIGS. 1 and 2 show a universal joint 100 in the general shape of an axisymmetric cylinder, whose axis is labelled 15 in FIG. 1.

The universal joint 100 comprises a first band 102a and a second band 102b. The two bands 102a-b are cylindrical bands which are coaxial with one another and which are arranged adjacent to one another in the direction of their common axis 15.

A slot 104 separates the first band 102a from the second band 102b.

In order to ensure that the bands 102a-b are held together, the universal joint 100 comprises a first and a second stiffener 108a-b which extend inside the bands 102a-b. Each stiffener 108a-b is in the form of a blade.

The first stiffener 108a extends in a first radial plane containing the common axis 15, and the second stiffener 108b extends in a second radial plane containing the common axis 15. The two radial planes are orthogonal.

Each stiffener 108a-b has a first end and a second end. For the first stiffener 108a, the first and second ends are joined to the first band 102a, and for the second stiffener 108b, the first and second ends are joined to the second band 102b.

The universal joint 100 also comprises a stem 110 which is coaxial with the common axis 15 and of which a first end is joined to the first stiffener 108a and of which a second end is joined to the second stiffener 108b. The stem 110 transmits the axial forces applied to the universal joint 100. The flexibility of the stem 110 in flexion allows a connection of the ball type. The length and diameter of the stem 110 can be adjusted according to the desired flexibility.

The universal joint 100 also comprises a crown 112 which is coaxial with the common axis 15 and which surrounds the stem 110, that is to say that the stem 110 is held captively in the crown 112. The internal diameter of the crown 112 is larger than the diameter of the stem 110 in order to limit contact between these two as the universal joint 100 deforms.

The universal joint 100 also comprises four torsion bars 106a-b (of which only two are shown in FIG. 1). All of the torsion bars 106a-b extend inside the bands 102a-b in a single plane P perpendicular to the common axis 15.

A first torsion bar 106a extends in the first radial plane and has a first end joined to the first band 102a and a second end joined to the crown 112.

A second torsion bar 106b extends in the second radial plane and has a first end joined to the second band 102b and a second end joined to the crown 112.

A third torsion bar 106c extends in the first radial plane and has a first end joined to the first band 102a and a second end joined to the crown 112.

A fourth torsion bar 106d extends in the second radial plane and has a first end joined to the second band 102b and a second end joined to the crown 112.

The four torsion bars 106a-b are distributed at regular angular intervals of 90° around the common axis 15, those torsion bars which are fixed to the same band 102a-b being coaxial.

When the universal joint 100 is loaded, the torsion bars 106a-b deform in torsion. Each torsion bar 106a-b tends to deform by twisting about its axis. The combination of deformations about the two axes permits deformation about an axis coplanar with the torsion bars 106a-b.

A universal joint 100 of this type thus has a simple shape without elements that move with respect to one another.

In order to attach the torsion bars 106a-b to the bands 102a-b, the slot 104 has a profile that rises and falls, which allows each band 102a-b to pass successively from one side of the plane P to the other.

In other words, in the embodiment of the disclosure herein shown in the single figure, when the first band 102a passes above the plane P, the first and third bars 106a and 106c are joined to the first band 102a at this passage. In the same way, when the second band 102b passes below the plane P, the second and fourth bars 106b and 106d are joined to the second band 102b at this passage.

In the embodiment of the disclosure herein presented here, the overall profile of the slot 104 is sinusoidal.

Depending on the forces to which it is likely to be subjected, the universal joint 100 may be made of any appropriate material such as metal or plastic.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A universal joint comprising:
a first band;
a second band, the first and second bands being cylindrical bands coaxial with one another with respect to a common axis, the first band and the second band being separated by a slot;
a first and a second stiffener, which extend, respectively, inside the bands, the first stiffener extending in a first radial plane containing the common axis, the second stiffener extending in a second radial plane orthogonal to the first radial plane and containing the common axis, and each stiffener having a first end and a second end, the first and second ends of the first stiffener being joined to the first band, and the first and second ends of the second stiffener being joined to the second band;
a stem which is coaxial with the common axis and of which a first end is joined to the first stiffener and of which a second end is joined to the second stiffener;
a crown that is coaxial with the common axis and surrounds the stem; and
four torsion bars, which extend inside the bands in a single plane that is perpendicular to the common axis and which are distributed at regular angular intervals of 90° around the common axis, the four torsion bars comprising:
a first torsion bar extending in the first radial plane and having a first end joined to the first band and a second end joined to the crown,
a second torsion bar extending in the second radial plane and having a first end joined to the second band and a second end joined to the crown,
a third torsion bar extending in the first radial plane and having a first end joined to the first band and a second end joined to the crown, and
a fourth torsion bar extending in the second radial plane and having a first end joined to the second band and a second end joined to the crown.

2. The universal joint of claim 1, wherein the universal joint is configured to provide articulation between structural elements by elastic deformation of the universal joint.

3. The universal joint of claim 1, wherein the universal joint has a shape of an axisymmetric cylinder.

4. The universal joint of claim 1, wherein the first and second bands are arranged adjacent to one another in a direction of the common axis.

5. The universal joint of claim 1, wherein one or more of the first and second stiffeners is in a form of a blade.

6. The universal joint of claim 5, wherein each of the first and second stiffeners are in the form of a blade.

7. The universal joint of claim 1, wherein the stem is configured to transmit axial forces to the universal joint.

8. The universal joint of claim 1, wherein the stem comprises a flexibility that allows a connection between structural elements of a ball type.

9. The universal joint of claim 8, wherein the flexibility can be adjusted to a desired flexibility by changing a length and/or diameter of the stem.

10. The universal joint of claim 1, wherein the stem is captive within the crown.

11. The universal joint of claim 10, wherein an internal diameter of the crown is larger than a diameter of the stem, such that contact therebetween is limited as the universal joint deforms.

12. The universal joint of claim 1, wherein torsion bars that are fixed to a same band are coaxial with each other.

13. The universal joint of claim 1, wherein the four torsion bars are configured to deform in torsion upon a loading of the universal joint.

14. The universal joint of claim 13, wherein each of the four torsion bars is configured to deform by twisting about a respective axis thereof.

15. The universal joint of claim 14, wherein a combination of deformations of the four torsion bars about respective axes associated therewith causes a deformation of the universal joint about an axis coplanar with the four torsion bars.

16. The universal joint of claim 1, wherein the slot has a profile that oscillates above and below the single plane, such that the first and second bands pass successively from one side of the single plane to another side of the single plane around a circumference of the universal joint.

17. The universal joint of claim 16, wherein the first and third torsion bars are joined to the first band where the first band passes above the single plane and the second and fourth torsion bars are joined to the second band where the second band passes below the single plane.

18. The universal joint of claim 16, wherein the slot comprises a profile that is sinusoidal.

19. The universal joint of claim 1, wherein the universal joint comprises one or more of a metal and a plastic material.

20. A universal joint comprising:
- a first band and a second band, wherein the first and second bands are coaxial with one another with respect to a common axis and are separated from each other by a slot;
- a first stiffener that extends within the first band, wherein the first stiffener extends in a first radial plane that includes the common axis, and wherein the first stiffener has respective first and second ends that are joined to the first band;
- a second stiffener that extends within the second band, wherein the second stiffener extends in a second radial plane, which is orthogonal to the first radial plane and contains the common axis, and wherein the second stiffener has respective first and second ends that are joined to the second band;
- a stem, which is coaxial with the common axis and comprises a first end that is joined to the first stiffener and a second end that is joined to the second stiffener;
- a crown that is coaxial with the common axis and surrounds the stem; and
- a plurality of torsion bars, which extend inside the bands in a single plane that is perpendicular to the common axis and which are distributed around the common axis.

* * * * *